(12) United States Patent
Nonaka (10) Patent No.: US 8,742,716 B2
(45) Date of Patent: Jun. 3, 2014

(54) INFORMATION OUTPUT APPARATUS

(76) Inventor: Takeshi Nonaka, Yokohama (JP)

( * ) Notice: Subject to any disclaimer, the term of this patent is extended or adjusted under 35 U.S.C. 154(b) by 357 days.

(21) Appl. No.: 12/997,608

(22) PCT Filed: Feb. 3, 2010

(86) PCT No.: PCT/JP2010/000636
§ 371 (c)(1),
(2), (4) Date: Dec. 13, 2010

(87) PCT Pub. No.: WO2010/095377
PCT Pub. Date: Aug. 26, 2010

(65) Prior Publication Data
US 2011/0095721 A1  Apr. 28, 2011

(30) Foreign Application Priority Data
Feb. 19, 2009  (JP) ................ 2009-037157

(51) Int. Cl.
*H01M 10/46* (2006.01)
*H02J 7/00* (2006.01)

(52) U.S. Cl.
USPC ................ 320/101; 320/103; 320/108

(58) Field of Classification Search
USPC .................... 320/101, 108, 103
See application file for complete search history.

(56) References Cited

U.S. PATENT DOCUMENTS

| | | | |
|---|---|---|---|
| 5,175,484 A * | 12/1992 | Witehira et al. | 320/125 |
| 5,905,356 A * | 5/1999 | Wells | 320/101 |
| 6,455,186 B1 * | 9/2002 | Moores et al. | 429/71 |
| 7,565,968 B2 * | 7/2009 | Lindley | 206/223 |
| 8,016,351 B2 * | 9/2011 | Cassaday | 297/217.1 |
| 2002/0040272 A1 * | 4/2002 | Nagasaka et al. | 701/211 |
| 2004/0117442 A1 * | 6/2004 | Thielen | 709/203 |
| 2006/0288384 A1 * | 12/2006 | Vitito | 725/77 |
| 2008/0211455 A1 * | 9/2008 | Park et al. | 320/108 |
| 2008/0279343 A1 * | 11/2008 | Bentley et al. | 379/33 |
| 2009/0115367 A1 * | 5/2009 | Kidakam | 320/101 |
| 2009/0268441 A1 * | 10/2009 | Chen | 362/192 |

FOREIGN PATENT DOCUMENTS

| | | | |
|---|---|---|---|
| JP | H04-021324 A | | 1/1992 |
| JP | H05-024486 A | | 2/1993 |
| JP | H11-278176 A | | 10/1999 |
| JP | 2001-043408 A | | 2/2001 |
| JP | 2004-359127 A | | 12/2004 |
| JP | 2007-069828 A | | 3/2007 |
| JP | 2007-336327 A | | 12/2007 |

OTHER PUBLICATIONS

English language Abstract by machine translation of JP 2007-069828 A.

(Continued)

*Primary Examiner* — M'Baye Diao (57) ABSTRACT

An information output apparatus comprises a body and a base station. The body has a first battery and an output unit. The first battery is a rechargeable battery. The output unit outputs information. The base station is fixed to a car and supports the body that is detachable. The base station has a power generator that converts at least one of light, heat, wind, or vibration to electrical energy. Charging the first battery is performed on the basis of electrical energy generated by the power generator, without using electrical energy charged in a car battery. The body operates on the basis of electrical energy that is either generated by the power generator or charged in the first battery, without using the electrical energy charged in the car battery.

10 Claims, 9 Drawing Sheets

(56) References Cited

OTHER PUBLICATIONS

English language Abstract by machine translation of JP 2001-043408 A.
English language Abstract by machine translation of JP 2007-336327 A.
English language Abstract by machine translation of JP H11-278176 A.
English language Abstract by machine translation of JP 2004-359127 A.
English language Abstract by machine translation of JP H05-024486 A.
English Translation of Japanese Office Action received on Sep. 5, 2013. including information of JP H04-021324 A.
English language Abstract by machine translation of JP H04-021324 A.

* cited by examiner

INFORMATION OUTPUT APPARATUS

FIELD

The present invention relates to an information output apparatus, and in particular, to a simplification of wiring the information output apparatus attached to a dashboard etc., of a car.

BACKGROUND

There is known an information output apparatus, such as a car navigation system, that displays the position of the car housing the car navigation system and a map with a route to the car's destination.

There are two different types of the car navigation systems from the viewpoint of installation of the device including their monitors. One is an in-dash installation type of device, including monitor, which is installed in the dashboard like a car audio system. The other is an on-dash installation type in which the device, including its monitor, is mounted on top of the dashboard.

In both cases, it is necessary to wire a ground line and power lines that include at least one battery line, through which the electrical current always flows, and an accessory line, through which the electrical current flows only when the accessory switch of the car is in the ON state, in order to supply electrical power to the car navigation system. PTL 1 discloses an on-dash installation type car navigation system.

CITATION LIST

Patent Literature

PTL 1

Japanese unexamined patent publication (KOKAI) No. 2007-69828

SUMMARY

Technical Problem

However, when the on-dash installation type car navigation system is installed, wiring the electrical power supply lines from the engine compartment or the inside of the dashboard is necessary. Therefore, an installation skill is necessary.

For simplifying the installation process, wiring the power lines from the cigarette lighter socket is cited. But, in this case, wires from the cigarette lighter socket to the car navigation system are visible, which reduces the visual quality of the car navigation system after installation.

Therefore, an object of the present invention is to provide an information output apparatus or a base station of the information output apparatus that can be easily installed with wires that are barely visible.

Solution to Problem

According to the present invention, an information output apparatus comprises a body and a base station.

The body has a first battery and an output unit. The first battery is a rechargeable battery. The output unit outputs information.

The base station is fixed to a car and supports the body that is detachable.

The base station has a power generator that converts at least one of light, heat, wind, or vibration to electrical energy.

Charging the first battery is performed on the basis of electrical energy generated by the power generator, without using electrical energy charged in a car battery.

The body operates on the basis of electrical energy that is either generated by the power generator or charged in the first battery, without using the electrical energy charged in the car battery.

BRIEF DESCRIPTION OF DRAWINGS

The objects and advantages of the present invention will be better understood from the following description, with reference to the accompanying drawings.

DESCRIPTION OF EMBODIMENTS

The present invention is described below with reference to the embodiment shown in the drawings.

The first embodiment is described. A car navigation system (an information output apparatus) 1 in the first embodiment comprises a body 10 and a base station (cradle) 30 (see FIG. 1).

Figure 2:
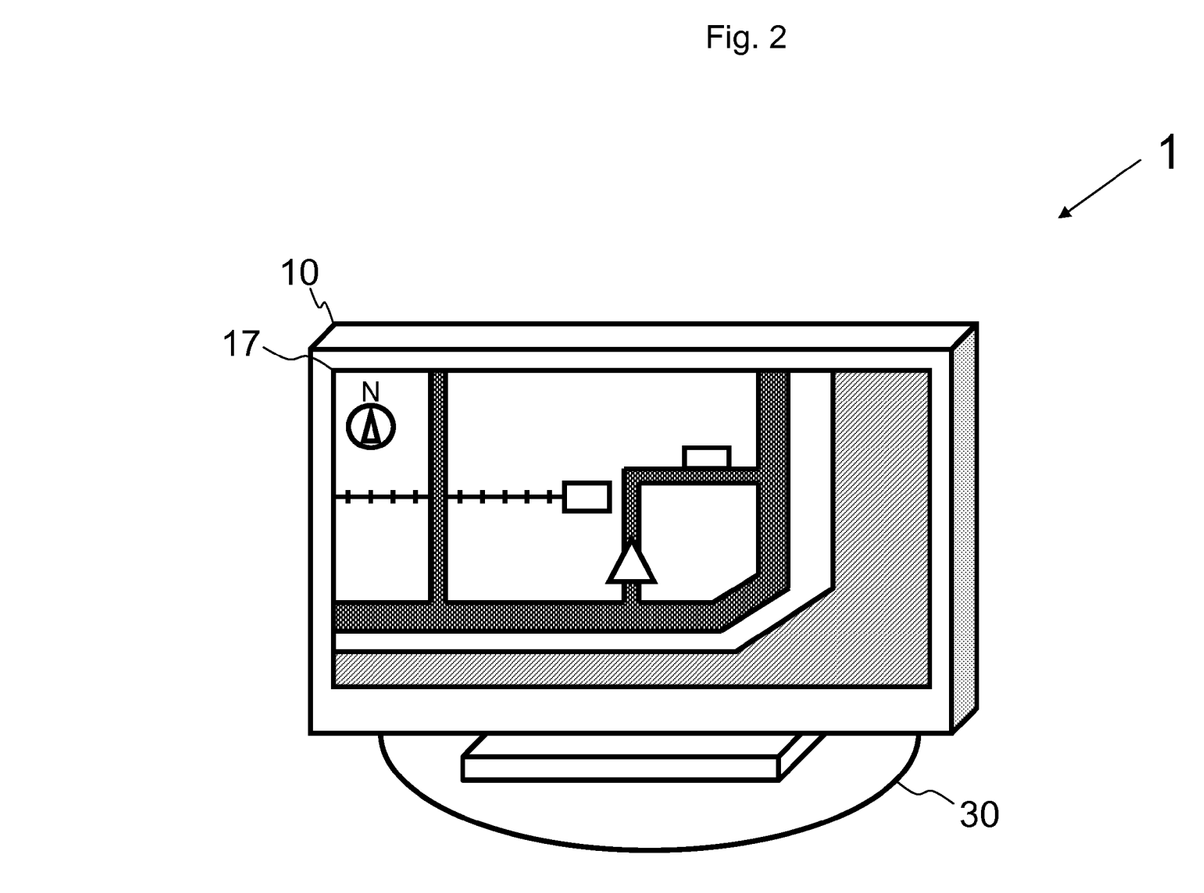
FIG. 2 is a perspective view of the information output apparatus under the condition in which the body is attached to the base station, in the first, second, third and fourth embodiments.

The base station 30 is fixed onto a dashboard of a car and supports the body 10 through a mounting member (not described), under the condition in which the body 10 is detachable from the base station 30 (see FIG. 2).

Note that, if a power generator 31 that is described later can be arranged in a position where the power generator 31 can receive solar light, a mounting position of the base station 30 may not be limited to the top of the on-dashboard. For example, the base station 30 may be fixed to the windshield, a sun visor, the rearview mirror, or an air conditioner vent.

Figure 3:
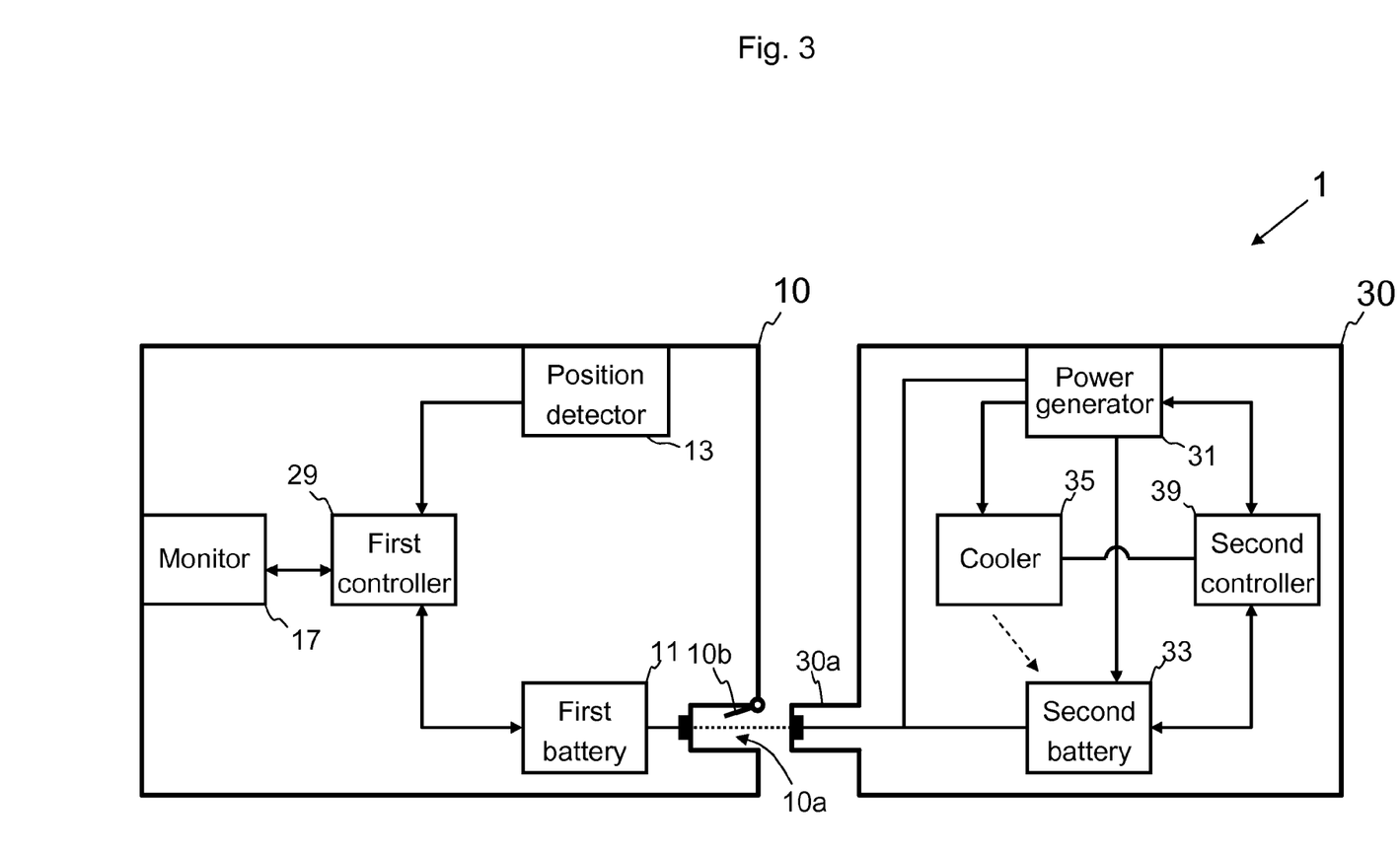
FIG. 3 is a construction diagram of the body and the base station, in the first embodiment.

The body 10 has a first battery 11, a position detector 13, a monitor 17, and a first controller 29 (see FIG. 3). The base station 30 has a power generator 31, a second battery 33, a cooler 35, and a second controller 39.

The construction of the body 10 is described.

The first battery 11 is a rechargeable battery (an accumulator battery). Charging the first battery 11 is performed on the basis of the electrical energy obtained from the power generator 31 or on the basis of the electrical energy charged in the second battery 33.

The electrical energy charged in the first battery 11 is used for driving the body 10 when the body 10 is not attached to the base station 30 etc. Driving the body 10 is an electrical operation of the car navigation system 1, and includes the main operations of the body 10, such as an indication by the monitor 17 etc.

Note that charging the first battery 11 may be performed on the basis of the electrical energy of AC power (not described) under the condition in which the body 10 is detached from the base station 30.

The position detector 13 is an apparatus that obtains latitude and longitude information on the basis of cell-based positioning, plural-base-station positioning, or GPS positioning, etc. The cell-based positioning is based on electrical wave information emitted from a single cellular base station. The plural-base-station positioning is based on the electrical wave information emitted from a plurality of cellular base stations.

The monitor 17 displays a position of the car, including the car navigation system 1, and a map with a route to the destination. The position of the car is specified on the basis of the latitude and longitude information provided by the position detector 13.

The first controller 29 is a control apparatus, such as a CPU etc. that controls each part of the body 10. Specifically, the first controller 29 ascertains the presence of the electrical power supply from the base station 30 (see step S11 of FIG. 4).

Figure 4:
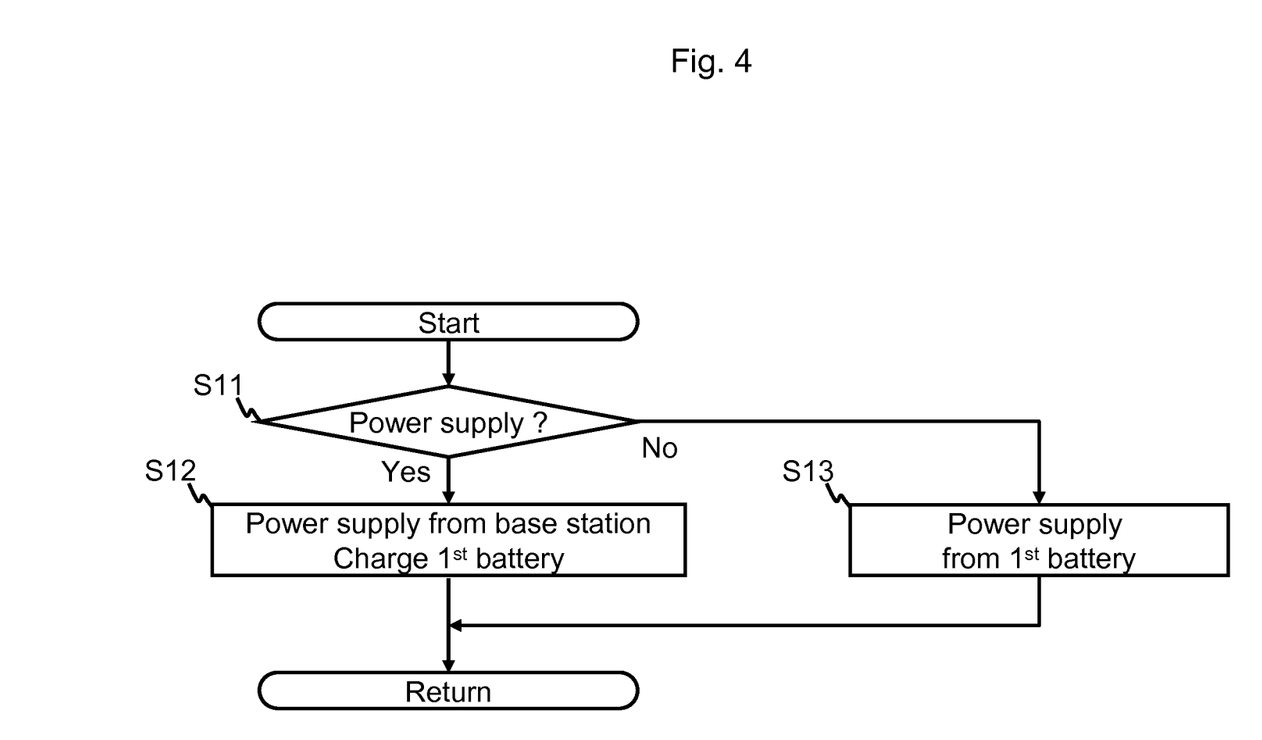
FIG. 4 is a flowchart that shows an electrical power supply control sequence for the first controller.

When electrical power is supplied from the base station 30 to the body 10, the electrical power from the base station 30 drives each part of the body 10 (see step S12 of FIG. 4).

Otherwise, electrical power from the first battery 11 drives each part of the body 10 (see step S13 of FIG. 4). Furthermore, when electrical power is supplied from the base station 30 to the body 10, the first controller 29 ascertains a state of charge of the first battery 11. When it is necessary to charge the first battery 11, the first controller 29 charges the first battery 11 on the basis of the electrical energy obtained from the power generator 31 or on the basis of the electrical energy charged in the second battery 33.

Next, the construction of the base station 30 is explained. The power generator 31 is a solar battery that converts light energy into electrical energy by means of the photovoltaic effect. In other words, solar photovoltaic power is generated.

The power generator 31 is arranged on the top surface of the base station 30 (see FIG. 1), or arranged in a position that can receive solar light through the windshield. For example, the power generator 31 may be arranged on a surface of the base station 30 opposite to a position on which the body 10 is attached.

Therefore, the power generator 31 generates electromotive force (generates electric power) on the basis of the received light while the power generator 31 receives sunlight during the daylight hours. In other words, the power generator 31 converts light energy into electrical energy during daytime etc.

Figure 5:
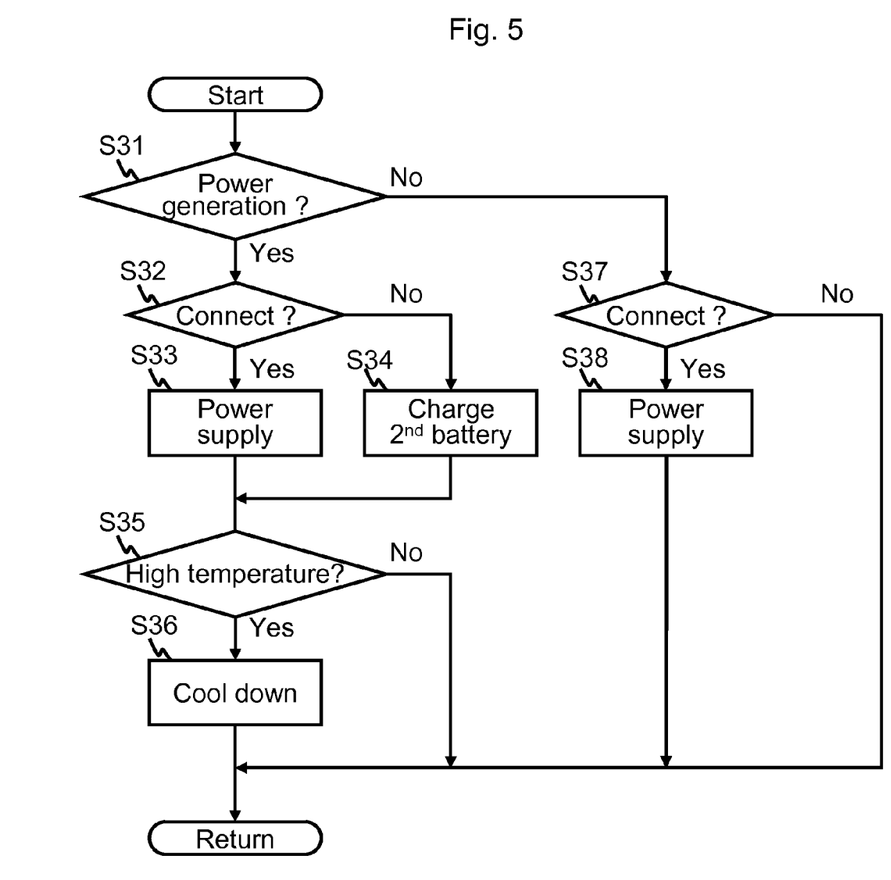
FIG. 5 is a flowchart that shows an electrical power supply control sequence for the second controller.

When the body 10 is attached to the base station 30, the electrical energy converted by the power generator 31 is initially used for driving the body 10 and for charging the first battery 11, but also for charging the second battery 33 of the base station 30 (see step S33 of FIG. 5). Furthermore, when the body 10 is not attached to the base station 30, the electrical energy converted by the power generator 31 is used for charging the second battery 33 (see step S34 of FIG. 5).

The second battery 33 is a rechargeable battery (an accumulator battery). Charging the second battery 33 is performed on the basis of electrical energy obtained from the power generator 31.

The electrical energy charged in the second battery 33 is used for driving the body 10 and for charging the first battery 11 when the power generator 31 does not receive sunlight, so that the power generator 31 does not generate the electromotive force when not exposed to direct sunlight, such as at nighttime etc.

When the car including the car navigation system 1 is not operated, so that the car navigation system 1 is not being used, the body 10 is detachable from the base station 30 to prevent theft.

In this case, the electrical energy obtained from the power generator 31 cannot be used for charging the first battery 11 of the body 10, but it can be used for charging the second battery 33 of the base station 30.

Furthermore, it is desirable that the first battery 11 included in the body 10 is light in weight and small in size in order to provide weight-saving and downsizing benefits to the body 10.

If the first battery 11 is downsized, the storage capacity of the first battery 11 becomes small. However, because the second battery 33 included in the base station 30 can be used for driving the body 10, the possibility of the battery going dead is low.

Note that the second battery 33 is set in the base station 30, which is fixed onto the dashboard so that it is not necessary to carry the second battery 33. Therefore, the large storage capacity second battery 33 can be used, instead of the first battery 11.

The cooler 35 is a cooling apparatus such as an air-cooling fan, a peltier device, etc. The cooler 35 is driven on the basis of the electrical energy converted by the power generator 31 and cools the second battery 33.

The body 10 can be detached from the base station 30. Therefore, when the body 10 is detached from the base station 30 the first battery 11 included in the body 10 can be cooled down.

On the other hand, the base station 30 including the second battery 33 is fixed to the dashboard and receives sunlight, which may cause high temperatures for the second battery 33.

However, in the first embodiment, the second battery 33 can be cooled by the cooler 35 to prevent the deterioration of the second battery caused by high temperatures.

It is necessary to supply electrical power to the cooler 35 for driving the cooler 35, but driving the cooler 35 is necessary only after the base station 30 has been exposed to sunlight for a long time.

In this case, the electrical energy can be obtained from the power generator 31, while the base station 30 including the power generator 31 is exposed to sunlight. Therefore, consumption of electrical power generated from electrical energy charged in the second battery 33 to drive the cooler 35 is not necessary.

The second controller 39 is a control apparatus, such as a CPU etc., that controls each part of the base station 30. Specifically, the second controller 39 controls the supply of electrical power to the body 10 when the body 10 is connected to the base station 30 (see steps S33 and S38 of FIG. 5).

Furthermore, the second controller 39 drives the cooler 35 when the temperature of the second battery 33 is high (see step S36 of FIG. 5).

Furthermore, when solar photovoltaic power is generated by the power generator 31, the second controller 39 ascertains the state of charge of the second battery 33.

When it is necessary to charge the second battery 33, the second controller 39 charges the second battery 33 on the basis of electrical energy obtained from the power generator 31 (see step S34 of FIG. 5).

Next, a control sequence for the electrical power supplied by the first controller 29 is explained using the flowchart in FIG. 4.

This control is performed in a predetermined time interval (for example, every 1 ms), while the first controller 29 operates on the basis of electrical energy either charged in the first battery 11 or the second battery 33, or generated by the power generator 31.

In step S11, the first controller 29 determines whether the electrical power is supplied from the base station 30 to the body 10.

For example, whether or not electrical power is supplied to the body 10 from the base station 30 is determined based on whether or not an electrical current flows through the electrical terminals that connect the body 10 to the base station 30.

When the body 10 is not supported by the base station 30, electrical current does not flow through these electrical terminals.

When the power generator 31 does not generate solar photovoltaic power and the second battery 33 is in an uncharged (empty) state, electrical current does not flow through these electrical terminals.

When the first controller 29 determines that electrical power is supplied from the base station 30 to the body 10, the operation continues to step S12, otherwise, the operation proceeds to step S13.

In step S12, the first controller 29 supplies electrical power to each part of the body 10 on the basis of electrical energy that is either generated by the power generator 31 or charged in the second battery 33.

Furthermore, the first controller 29 charges the first battery 11 depending on the operation of the body 10 and the state of charge of the first battery 11.

In step S13, the first controller 29 supplies electrical power to each part of the body 10 on the basis of electrical energy charged in the first battery 11.

Figure 1:
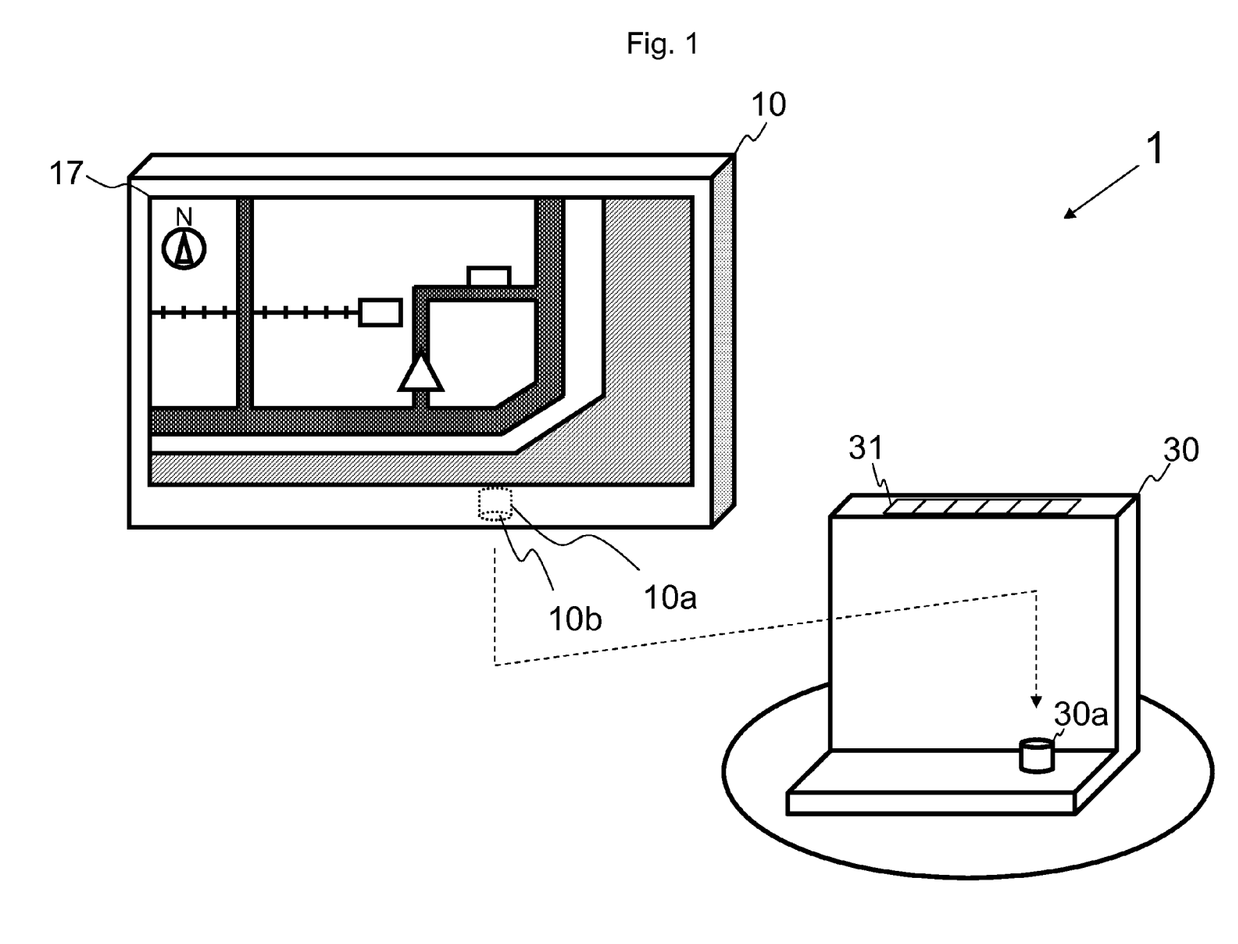
FIG. 1 is a perspective view of the information output apparatus under the condition in which the body is detached from the base station, in the first, second, third and fourth embodiments.

Electrical power supplied from the base station 30 to the body 10 is conducted between a first electrical terminal of the concave portion 10a in the body 10 and a second electrical terminal of the salient portion 30a in the base station 30.

When the body 10 is attached to the base station 30, the concave portion 10a engages with the salient portion 30a, the first electrical terminal of the concave portion 10a makes contact with the second electrical terminal of the salient portion 30a, and electrical power can be supplied from the base station 30 to the body 10 through the concave portion 10a and the salient portion 30a.

The electrical connection of the concave portion 10a engaged to the salient portion 30a can be ascertained when the body 10 is attached to the base station 30.

Furthermore, a flapper 10b is set in front of the concave portion 10a. The flapper 10b is opened by the insertion of the salient portion 30a when the concave portion 10a engages with the salient portion 30a. The flapper 10b is closed when the concave portion 10a does not engage with the salient portion 30a.

When the concave portion 10a does not engage with the salient portion 30a, the first electrical terminal inside the concave portion 10a is covered by the closed flapper 10b. Therefore, dust incursion that may cause a contact failure can be prevented.

Next, a control sequence for the supply of electrical power by the second controller 39 is explained using the flowchart in FIG. 5.

This control is performed in a predetermined time interval (for example, every 1 ms), while the second controller 39 operates on the basis of electrical energy that is either charged in the second battery 33 or generated by the power generator 31.

In step S31, the second controller 39 determines whether the power generator 31 generates solar photovoltaic power. When the second controller 39 determines that the power generator 31 generates solar photovoltaic power, the operation continues to step S32, otherwise, the operation proceeds to step S37.

In step S32, the second controller 39 determines whether the body 10 is attached to the base station 30.

For example, whether the body 10 is attached to the base station 30 is determined on the basis of whether an electrical current can flow through the first and second electrical terminals that connect the body 10 to the base station 30.

When the second controller 39 determines that the body 10 is attached to the base station 30, the operation continues to step S33, otherwise, the operation proceeds to step S34. In step S33, the second controller 39 supplies electrical power to the body 10 on the basis of electrical energy generated by the power generator 31.

Furthermore, the second controller 39 may charge the second battery 33, depending on the operation of the body 10 and the state of charge of the second battery 33.

In step S34, the second controller 39 ascertains the state of charge of the second battery 33.

When it is necessary to charge the second battery 33, the second controller 39 charges the second battery 33 on the basis of electrical energy generated by the power generator 31.

In step S35, the second controller 39 determines whether the temperature of the second battery 33 is high on the basis of information from a temperature sensor (not depicted) etc.

When the second controller 39 determines that the temperature of the second battery 33 is high, the operation continues to step S36, otherwise, the operation finishes. In step S36, the second controller 39 drives the cooler 35 for cooling the second battery 33.

In step S37, the second controller 39 determines whether the body 10 is attached to the base station 30.

When the second controller 39 determines that the body 10 is attached to the base station 30, the operation continues to step S38, otherwise, the operation finishes.

In step S33, the second controller 39 supplies electrical power to the body 10 on the basis of electrical energy charged in the second battery 33.

In the first embodiment, the body 10 operates on the basis of electrical energy that is either generated by the power generator 31 or charged in the second battery 33 or the first battery 11. Electrical energy charged in the car battery is not necessary to drive the body 10.

Therefore, the possibility of electrical power consumed by the car navigation system 1 affecting the electrical system of the car can be reduced.

Furthermore, wiring power lines between the car battery, etc., and the body 10 and the base station 30 on the dashboard is not necessary. The power lines include a battery line through which the electrical current always flows and an accessory line through which the electrical current flows only when the accessory switch of the car is in the ON state.

Therefore, installation of the car navigation system 1 can be simplified.

Furthermore, the amount of wires related to the car navigation system 1 that are visible on the dashboard can be reduced so that the visual quality after installation of the car navigation system 1 is better than the case when multiple wires are visible on the dashboard.

Furthermore, the circuit of the car navigation system 1 can be constructed without considering the power voltage of the car battery.

Specifically, electrical parts that transform power from a high voltage (24V or 12V) car battery to the lower voltages (3 to 5V) appropriate for driving the car navigation system 1, such as DC-DC converter etc., can be eliminated. Therefore, the construction of the body 10 and the base station 30 can be simplified.

Furthermore, the body 10 is not enlarged by the power generator 31 because the power generator 31 is set in the base station 30.

Furthermore, the body 10 can be used even if the body 10 is detached from the base station 30 because the first battery 11 is included in the body 10.

Therefore, the body 10 is not limited to the car navigation system 1, under the condition in which the body 10 includes the first battery 11 and outputs information on the basis of electrical energy charged in the first battery 11 when the body 10 is detached from the base station 30. For example, the body 10 can also be a handheld music player that outputs sounds such as music etc., a display device such as a TV that outputs images, or a radar detector.

Furthermore, electrical power may be supplied from the base station 30 to the body 10 using magnetic coupling through transformers Tr1 and Tr2 (see FIG. 9) that are set in the body 10 and the base station 30, respectively.

Figure 9:
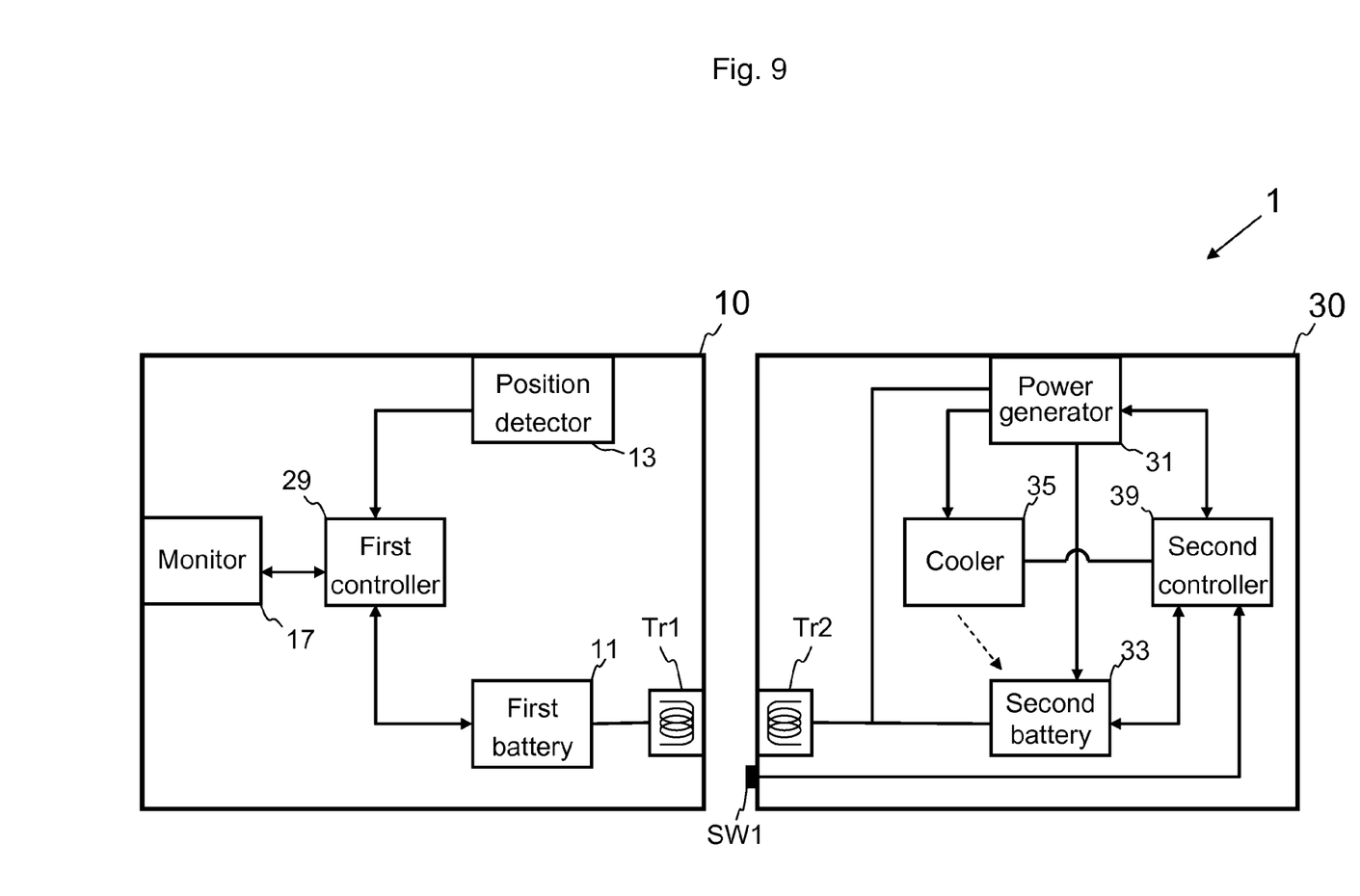
FIG. 9 is a construction diagram of the body and the base station including transformers, in the first embodiment.

In this case, an ascertaining device that detects the connection between the body 10 and the base station 30, and a control device that supplies electrical power after the connection is ascertained are necessary. However, the first electrical terminal of the body 10 and the second electrical terminal of the base station 30 can be eliminated.

For example, the base station 30 has a switch SW1 that is in the ON state when the body 10 is attached to the base station 30 as the ascertaining device. When the switch SW1 is in the ON state, the second controller 39 is the control device that supplies electrical power to the transformer Tr2 of the base station 30.

Next, the second embodiment is explained. In the second embodiment, the body 10 further has a vibration detector (a second detector) 12. An ON/OFF control of the body 10 is performed on the basis of a signal output from the vibration detector 12. The points that differ from the first embodiment are explained next (see FIG. 6).

Figure 6:
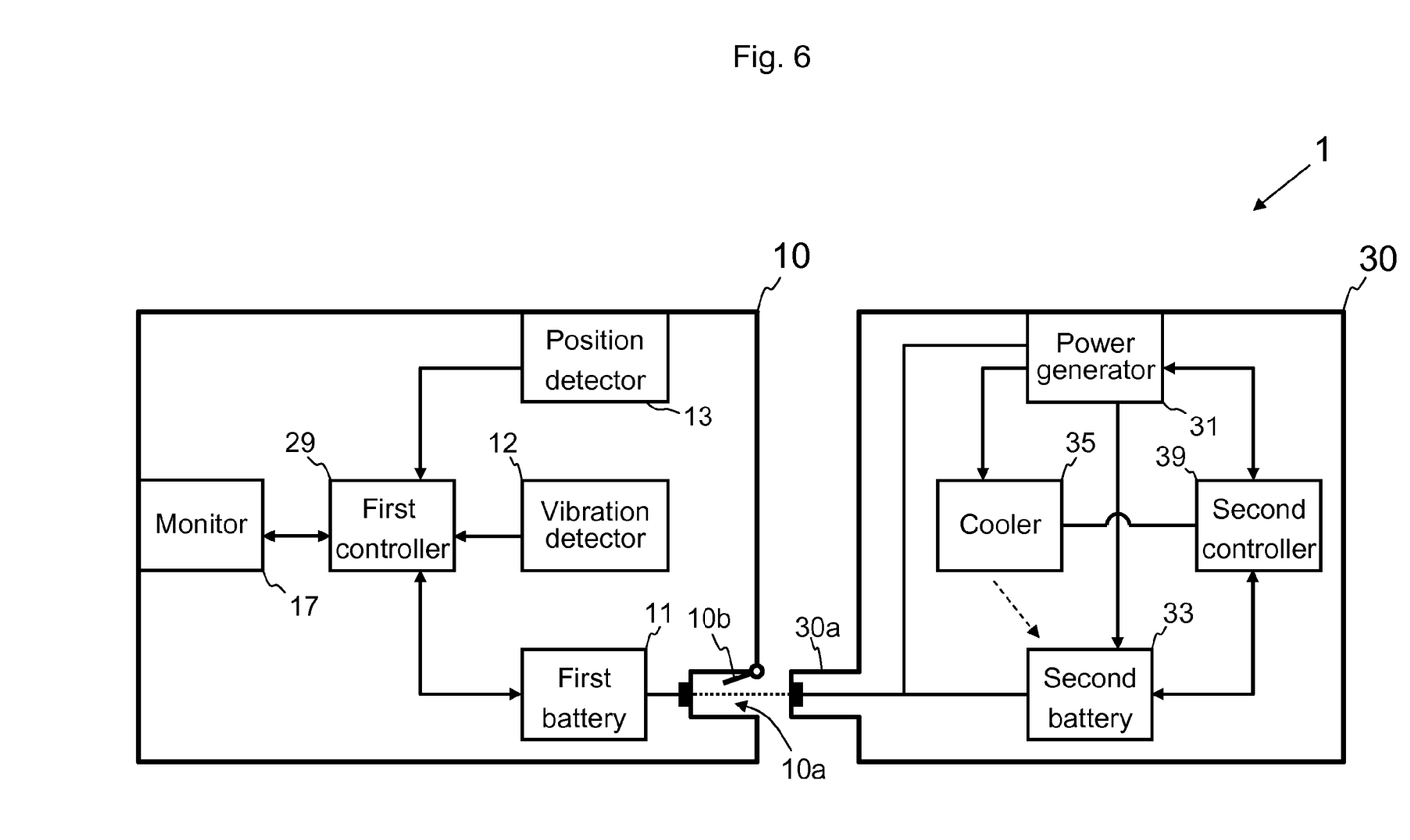
FIG. 6 is a construction diagram of the body and the base station, in the second embodiment.

The vibration detector 12 in the second embodiment is an acceleration sensor that detects gravitational acceleration components in two or three directions that are perpendicular to each other.

The first controller 29 determines the operational status of the car on the basis of each component of gravitational acceleration.

Specifically, when the engine of the car operates, the vibration caused by the operation of the engine affects the output values of each gravitational acceleration component as gravitational acceleration changes with time. Therefore, the first controller 29 determines that the engine stops when the fluctuating band per unit time of the output values for each component of gravitational acceleration is small.

In this case the first controller 29 sets the main operation of the body 10, such as the display of the monitor 17, to the OFF state.

The first controller 29 determines that the engine is operating when at least one of the fluctuating bands per unit time of the output values for the components of gravitational acceleration is large.

In this case, the first controller 29 sets the main operation of the body 10 to the ON state.

Note that for an operation that is always performed, such as a clock function, the power supply control in FIG. 4 is maintained in the ON state regardless of the output of the vibration detector 12.

When the body 10 is supported by the user's hand, a vibration caused by hand shake is transmitted to the body 10 so that the fluctuating bands per unit time of the output values for the components of gravitational acceleration are large. However, a vibration pattern caused by hand shake is different from a vibration pattern caused by the operation of the engine. So, a difference between the vibration patterns caused by hand shake and operation of the engine can be identified if the first controller 29 stores the fluctuating bands per unit time corresponding to these patterns. Therefore the first controller 29 can determine the ON/OFF states of the engine by distinguishing between the vibration caused by the engine and a vibration caused by another operation, such as a hand shake etc.

In the first embodiment, the body 10 and the base station 30 are not electrically connected to the car battery so that they do not use electrical energy charged in the car battery. Therefore, they cannot electrically detect the ON/OFF states of the engine. Accordingly, a manual ON/OFF control of the body 10 by the user is necessary regardless the ON/OFF control of the engine.

In the second embodiment, the vibration detector 12 detects the vibration state of the car so that the first controller 29 recognizes the ON/OFF state of the engine. Therefore, the ON/OFF state of the main operation of the body 10 can be automatically controlled corresponding to the ON/OFF state of the engine.

Note that the vibration detector 12 may not be limited to the acceleration sensor. It may be a sensor that can detect the vibration of the engine. For example, the vibration detector 12 may be an angular velocity sensor that detects angular velocities around two or three axes that are perpendicular to each other. In this case, the first controller 29 recognizes the ON/OFF state of the engine on the basis of the fluctuating bands per unit time of the output values regarding the angular velocity.

In the second embodiment the vibration detector 12 is arranged in the body 10. However, the vibration detector 12 may be arranged in the base station 30 and the second controller 39 may send the gravitational acceleration information obtained by the vibration detector 12 to the first controller 29.

In this case, in addition to the electrical power line it is also necessary to arrange a signal line between the body and the base station 30 for transmission of the gravitational acceleration information.

Next, the third embodiment is explained. In the third embodiment, the vibration detector (the second detector) 12 in the body 10 is eliminated and an electrical current detector (a first detector) 40 is used for detecting the ON/OFF state of the engine (see FIG. 7). The points that differ from the second embodiment are explained next.

Figure 7:
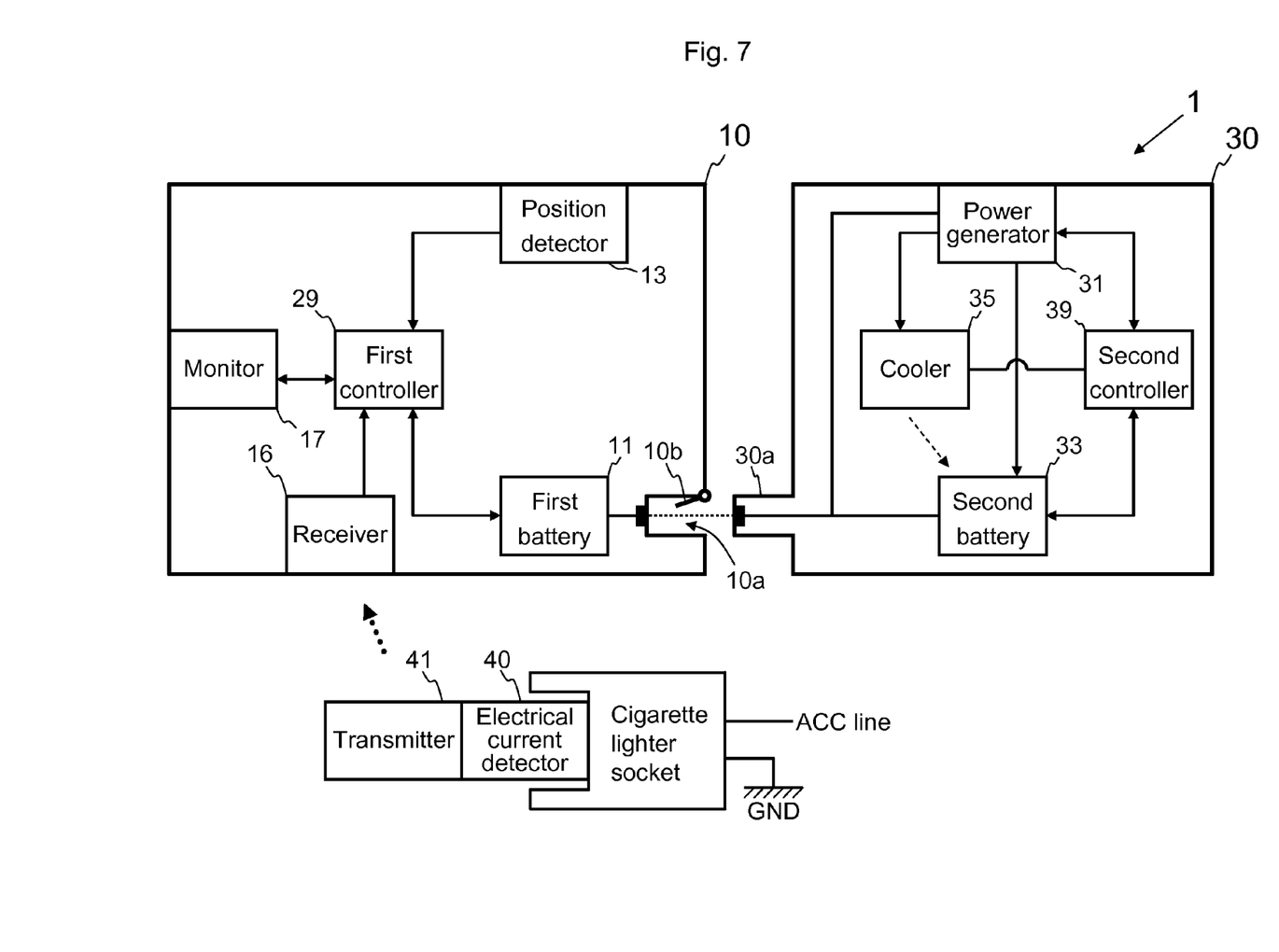
FIG. 7 is a construction diagram of the body and the base station, in the third embodiment.

The electrical current detector 40 in the third embodiment is attached to the cigarette lighter socket of the car and detects an electrical current that flows through the cigarette lighter socket. In other words, the electrical current detector 40 ascertains the presence of an electrical power supply through the cigarette lighter socket.

When the electrical current detector 40 detects the electrical current that flows through the cigarette lighter socket, a transmitter 41 that is arranged adjacently to the electrical current detector 40 sends a predetermined first information signal to a receiver 16 of the body 10. Communication between the transmitter 41 and the receiver 16 is performed via Bluetooth, etc.

When the electrical current detector 40 does not detect the electrical current that flows through the cigarette lighter socket, the transmitter 41 does not send a signal.

Both the electrical current detector 40 that detects the electrical current and the transmitter 41 that sends the first information operate on the basis of the electrical power supplied from the car battery through the cigarette lighter socket. Therefore, when the electrical power is not supplied through the cigarette lighter socket, neither does the electrical current detector 40 nor the transmitter 41 consume electrical power.

When the receiver 16 does not receive the first information, the first controller 29 determines that the accessory power supply of the car is in the OFF state and the first controller 29 sets the main operation of the body 10, such as the display of the monitor 17, to the OFF state. Note that an operation that is always performed, such as the reception of the first information, the clock function, or the electrical power supply control in FIG. 4 etc., is maintained in the ON state regardless of the detection results of the electrical current detector 40.

The electrical current that flows through the cigarette lighter socket usually corresponds to the electrical current that flows through the accessory line. Specifically, when the accessory power supply of the car is set to the OFF state, electrical power is not supplied through the cigarette lighter socket. When the accessory power supply of the car is set to the ON state, electrical power is supplied through the cigarette lighter socket. Therefore, the control of the ON/OFF state of the body 10 coupled with the ON/OFF state of the accessory power supply of the car can be performed, by detecting the electrical power supply to the cigarette lighter socket and equating it with the ON/OFF state of the accessory power supply.

Note that there may be a car whose electrical power supply through the cigarette lighter socket does not correspond to the ON/OFF state of the accessory power supply. In this case, electrical power is always supplied through the cigarette lighter socket. Therefore, the effect of the third embodiment cannot be obtained in such a car.

Figure 8:
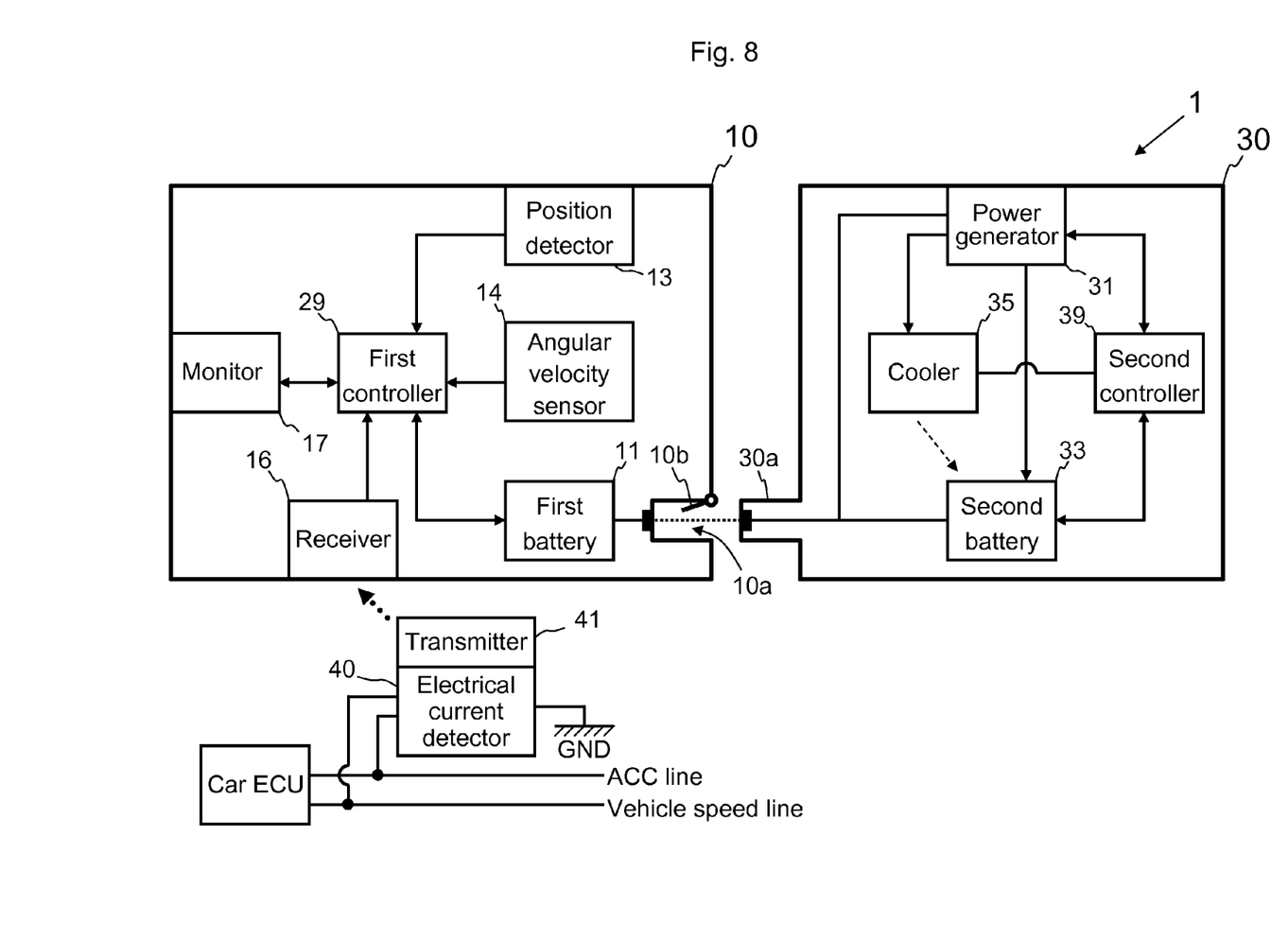
FIG. 8 is a construction diagram of the body and the base station, in the fourth embodiment.

Next, the fourth embodiment is explained. The construction of the electrical current detector 40 in the fourth embodiment is different from that in the third embodiment. The points that differ from the third embodiment are explained next.

The electrical current detector 40 in the fourth embodiment is arranged near the ECU (Engine Control Unit) of the car (see FIG. 8). The electrical current detector 40 is connected with the ECU through the accessory line and the vehicle speed line.

The electrical current detector 40 detects the electrical current that carries the accessory power to the ECU. In other words, the electrical current detector 40 ascertains the presence of an electrical power supply from the accessory power supplied to the ECU.

Furthermore, the electrical current detector 40 detects a vehicle speed signal pulse through the vehicle speed line. When the electrical current detector 40 detects the electrical current to the ECU, the transmitter 41 that is arranged adjacently to the electrical current detector 40 sends a signal including information regarding the vehicle speed as the first information to a receiver 16 of the body 10.

When the electrical current detector 40 does not detect an electrical current to the ECU, the transmitter 41 does not send a signal.

Both the electrical current detector 40 that detects the electrical current and the transmitter 41 that sends the first information operate on the basis of the electrical power supplied from the car battery to the ECU. Therefore, when the accessory power supply is in the OFF state, neither does the electrical current detector 40 nor the transmitter 41 consume electrical power.

When the receiver 16 does not receive the first information, the first controller 29 determines that the accessory power supply of the car is in the OFF state and that the first controller 29 sets the main operation of the body 10, such as the display of the monitor 17, to the OFF state. Note that an operation that is always performed, such as the reception of the first information, the clock function, or the electrical power supply control in FIG. 4 etc., is maintained in the ON state regardless of the detection results of the electrical current detector 40.

In the fourth embodiment, the first controller 29 can obtain not only the information that the accessory power supply is in the ON state, but also information regarding the speed of the vehicle based on the vehicle speed signal pulse. The first controller 29 specifies the position of the car on the basis of vehicle speed information, information from the position detector 13, and information from an angular velocity sensor 14 in the body 10.

Therefore, the first controller 29 can perform positioning with greater accuracy than when positioning is performed on the basis of only information from the position detector 13.

Furthermore, the first controller 29 may perform a control that limits (prohibits) a user's operation of the body 10 for safety reasons, such as when the first controller 29 determines that the speed of the vehicle exceeds a certain threshold.

In the third and fourth embodiments, the receiver 16 is arranged in the body 10. However, the receiver 16 may be arranged in the base station 30 and the second controller 39 may transmit the first information to the first controller 29.

In this case, in addition to the electrical power line it is also necessary to arrange a signal line between the body 10 and the base station 30 for transmission of the first information.

In the first, second, third, and fourth embodiments, the power generator 31 is a solar battery. However, the power generator 31 is not limited to a solar battery and it may be another apparatus that converts energy based on heat, wind, vibration, etc., to electrical energy. Particularly because heat energy can be obtained from solar light through the windshield of the car, the electrical energy can be obtained during daylight hours regardless of the operational status of the engine.

Furthermore, wind energy can be obtained from the stream of air emitted by the air conditioner that passes from the dashboard to the windshield (or from the air conditioner vent to the front seat). Therefore, electrical energy can be obtained while the air conditioner operates. Furthermore, vibration energy can be obtained from the vibration of the car caused by the operation of the engine. The electrical energy can be obtained by using a piezoelectric element etc., while the engine operates.

Although the embodiment of the present invention has been described herein with reference to the accompanying drawings, obviously many modifications and changes may be made by those skilled in this art without departing from the scope of the invention.

The present disclosure relates to subject matter contained in Japanese Patent Application No. 2009-037157 (filed on Feb. 19, 2009), which is expressly incorporated herein by reference, in its entirety.

The invention claimed is:

1. An information output apparatus comprising:
a body that has a first battery and an output unit, said first battery being a rechargeable battery, said output unit outputting information;
a base station that is fixed to a car and supports said body that is detachable;
a first detector that detects the ON/OFF state of an accessory power supply of said car to which said base station is mounted; and
a transmitter that wirelessly transmits detection results of said first detector as a first information;
said base station having a power generator that converts at least one of light, heat, wind, or vibration to electrical energy, and being a cradle for said body;
charging said first battery being performed on the basis of electrical energy generated by said power generator, without using electrical energy charged in a car battery;
said body operating on the basis of electrical energy that is either generated by said power generator or charged in said first battery, without using the electrical energy charged in said car battery;
wherein at least one of said base station or said body has a receiver that receives said first information from said transmitter;
said body has a controller that controls the ON/OFF state of said body on the basis of said first information.

2. The information output apparatus according to claim 1, wherein said first detector is attached to a cigarette lighter socket of said car, said first detector detects whether electrical power is supplied to said cigarette lighter socket as the ON/OFF state of said accessory power supply.

3. The information output apparatus according to claim 1, wherein said first detector detects a vehicle speed signal from an ECU of said car; and
said transmitter sends information regarding the ON/OFF state of said accessory power supply and information regarding vehicle speed from said vehicle speed signal, as said first information.

4. The information output apparatus according to claim 1, wherein said base station has a battery that is a rechargeable battery;
charging said battery that said base station has is performed on the basis of electrical energy generated by said power generator;
said body operates on the basis of electrical energy that is either generated by said power generator, charged in said first battery, or charged in said battery that said base station has;
wherein electrical energy generated by said power generator is preferentially used for driving said body and for charging said first battery when said body is connected to said base station through said cradle.

5. The information output apparatus according to claim 4, wherein said power generator converts at least one of light or heat to electrical energy;
said base station operates on the basis of electrical energy generated by said power generator and has a cooler that cools down said battery that said base station has.

6. The information output apparatus according to claim 1, wherein said base station has an ascertaining device that ascertains a state of connection between said body and said base station;
electrical power is supplied from said base station to said body by magnetic coupling after the state of connection is ascertained by said ascertaining device.

7. The information output apparatus according to claim 1, wherein at least one of said base station or said body has a detector that detects information regarding vibration of said car to which said base station is mounted;
said body has a controller that controls the ON/OFF state of said body on the basis of said vibration information.

8. A base station of an information output apparatus comprising:
a power generator that converts at least one of light, heat, wind or vibration to electrical energy;
said base station being fixed to a car, supporting a body that is detachable, and being a cradle for said body;
said body having a first battery and an output unit, said first battery being a rechargeable battery, said output unit outputting information;
charging said first battery being performed on the basis of electrical energy generated by said power generator, without using electrical energy charged in a car battery;
said body operating on the basis of electrical energy generated by said power generator or charged in said first battery, without using the electrical energy charged in said car battery;
wherein at least one of said base station or said body has a receiver that receives a first information from a transmitter;
said transmitter wirelessly transmits detection results of a first detector as said first information;
said first detector detects the ON/OFF state of an accessory power supply of said car to which said base station is mounted; and
said body has a controller that controls the ON/OFF state of said body on the basis of said first information.

9. An information output apparatus comprising:
a body that has a first battery and an output unit, said first battery being a rechargeable battery, said output unit outputting information; and
a base station that is fixed to a car and supports said body that is detachable;
said base station having a power generator that converts at least one of light, heat, wind, or vibration to electrical energy, and being a cradle for said body;
charging said first battery being performed on the basis of electrical energy generated by said power generator, without using electrical energy charged in a car battery;
said body operating on the basis of electrical energy that is either generated by said power generator or charged in said first battery, without using the electrical energy charged in said car battery;
wherein one of said body or said base station has a concave portion;
the other of said body or said base station has a salient portion;
said concave portion engages with said salient portion when said body is attached to said base station;
electrical power is supplied from said base station to said body through said concave portion and said salient portion;
said concave portion has a flapper that is opened by insertion of said salient portion when said concave portion engages with said salient portion; and
said flapper is closed when said concave portion does not engage with said salient portion.

10. A base station of an information output apparatus comprising:

a power generator that converts at least one of light, heat, wind or vibration to electrical energy;

said base station being fixed to a car, supporting a body that is detachable, and being a cradle for said body;

said body having a first battery and an output unit, said first battery being a rechargeable battery, said output unit outputting information;

charging said first battery being performed on the basis of electrical energy generated by said power generator, without using electrical energy charged in a car battery;

said body operating on the basis of electrical energy generated by said power generator or charged in said first battery, without using the electrical energy charged in said car battery;

wherein one of said body or said base station has a concave portion;

the other of said body or said base station has a salient portion;

said concave portion engages with said salient portion when said body is attached to said base station;

electrical power is supplied from said base station to said body through said concave portion and said salient portion;

said concave portion has a flapper that is opened by insertion of said salient portion when said concave portion engages with said salient portion; and said flapper is closed when said concave portion does not engage with said salient portion.

* * * * *